US009310851B2

(12) United States Patent
Cheng et al.

(10) Patent No.: US 9,310,851 B2
(45) Date of Patent: Apr. 12, 2016

(54) THREE-DIMENSIONAL (3D) HUMAN-COMPUTER INTERACTION SYSTEM USING COMPUTER MOUSE AS A 3D POINTING DEVICE AND AN OPERATION METHOD THEREOF

(71) Applicant: AMCHAEL VISUAL TECHNOLOGY CORPORATION, Hsinchu (TW)

(72) Inventors: Kai Michael Cheng, Hsinchu (TW); Yushiuan Tsai, Guishan Township (TW)

(73) Assignee: AMCHAEL VISUAL TECHNOLOGY CORPORATION, Hsinchu (TW)

(*) Notice: Subject to any disclaimer, the term of this patent is extended or adjusted under 35 U.S.C. 154(b) by 227 days.

(21) Appl. No.: 14/068,208

(22) Filed: Oct. 31, 2013

(65) Prior Publication Data

US 2014/0359536 A1 Dec. 4, 2014

Related U.S. Application Data

(60) Provisional application No. 61/830,168, filed on Jun. 3, 2013.

(51) Int. Cl.
*G06F 3/048* (2013.01)
*G06F 1/16* (2006.01)
(Continued)

(52) U.S. Cl.
CPC .............. *G06F 1/169* (2013.01); *G06F 3/0213* (2013.01); *G06F 3/0304* (2013.01);
(Continued)

(58) Field of Classification Search
CPC ...................................................... G06F 1/169
USPC ......................................................... 715/848
See application file for complete search history.

(56) References Cited

U.S. PATENT DOCUMENTS 5,532,777 A 7/1996 Zanen
5,909,209 A 6/1999 Dickinson
(Continued)

FOREIGN PATENT DOCUMENTS

EP 2226707 B1 1/2013

OTHER PUBLICATIONS

Freanz Madritsch; "CCD-Camera Based Optical Tracking for Human-Computer Interaction"; Proceedings 1st European Conference on Disability, Virtual Reality and Associated Technologies, Maidenhead; pp. 161-170 (1996).
(Continued)

*Primary Examiner* — William Titcomb
(74) *Attorney, Agent, or Firm* — King & Schickli, PLLC

(57) ABSTRACT

A three-dimensional user interface system includes at least one pointing/input device and an imaging device configured for capturing one or more image frames each providing at least two different views of a scene including the at least one pointing/input device. The imaging device is a multi-view imaging device which provides at least two different views of the scene per each of the one or more image frames captured. One or more software programs calculate from reference points in the image frames at least a spatial and a velocity parameter of the at least one pointing/input device when moved through a three-dimensional space and for rendering on a graphical user interface of a computing device a visual marker corresponding to the spatial and velocity parameters of the at least one pointing/input device in three-dimensional space. Methods for three-dimensional pointing and/or data input incorporating the described system are also provided.

22 Claims, 5 Drawing Sheets

(51) Int. Cl.
  *G06F 3/02* (2006.01)
  *G06F 3/03* (2006.01)
  *G06F 3/038* (2013.01)
  *G06F 3/0354* (2013.01)
  *G06F 3/0346* (2013.01)

(52) U.S. Cl.
  CPC ........... *G06F 3/0317* (2013.01); *G06F 3/0346* (2013.01); *G06F 3/0383* (2013.01); *G06F 3/03543* (2013.01); *G06F 3/03544* (2013.01)

(56) References Cited

U.S. PATENT DOCUMENTS

| | | | |
|---|---|---|---|
| 6,057,540 A | 5/2000 | Gordon et al. | |
| 6,072,496 A * | 6/2000 | Guenter | G06K 9/00201 345/419 |
| 6,525,306 B1 | 2/2003 | Bohn | |
| 6,643,396 B1 | 11/2003 | Hendriks et al. | |
| 7,142,890 B2 * | 11/2006 | Irimajiri | G06F 1/1616 345/419 |
| 7,274,800 B2 | 9/2007 | Nefian et al. | |
| 7,296,242 B2 * | 11/2007 | Agata | G06F 1/1616 715/782 |
| 7,849,421 B2 | 12/2010 | Yoo et al. | |
| 7,880,738 B2 * | 2/2011 | Abagyan | G06T 19/00 345/420 |
| 8,640,182 B2 * | 1/2014 | Bedingfield, Sr. | H04N 13/0059 348/51 |
| 8,910,072 B2 * | 12/2014 | Goossens | G06F 3/0482 715/781 |
| 2009/0315825 A1 | 12/2009 | Cauchi | |
| 2010/0017115 A1 | 1/2010 | Gautama | |
| 2011/0169734 A1 | 7/2011 | Cho et al. | |
| 2011/0246950 A1 * | 10/2011 | Luna | H04M 1/72583 715/848 |
| 2011/0310230 A1 | 12/2011 | Cheng | |
| 2012/0284670 A1 * | 11/2012 | Kashik | G06F 15/00 715/848 |
| 2013/0007670 A1 * | 1/2013 | Roos | G06F 15/16 715/851 |

OTHER PUBLICATIONS

Richard Hartley, et al.; "Triangulation"; Computer Vision and Image Understanding, vol. 68, No. 2, pp. 146-157 (1997); Article No. IV970547.

Philips; "uWand technology"; How uWand Works—Intuitive3 Remotes for SmartTV; 1 page printed on Sep. 16, 2014; http://www.uwand.com/how-uwand-works.html.

Wii from Wikipedia; 33 pages printed on Sep. 16, 2014; http://en.wikipedia.org/wiki/Wii.

U.S. Appl. No. 14/089,881, filed Nov. 26, 2013 entitled Algorithms, Software and an Interaction System That Support the Operation of an on the Fly Mouse.

Pranav Mistry; Mouseless, the 'invisible' computer mouse (w/Video); Phys.org; Jul. 8, 2010; 2 pages; http://phys.org/news197792915.html.

Pranav Mistry and Pattie Maes; "Mouseless"; MIT Media Laboratory, Oct. 2010, pp. 441-442.

"Mouse (computing)"; Wikipedia; Sep. 25, 2013; 8 pages; http://en.wikipedia.org/wiki/Mouse_(computing).

* cited by examiner

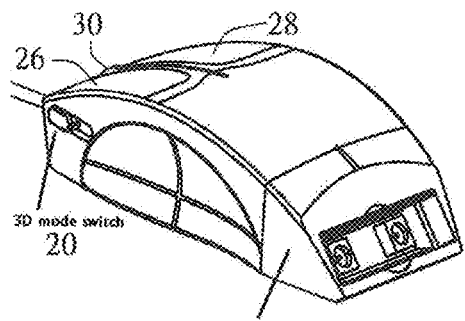 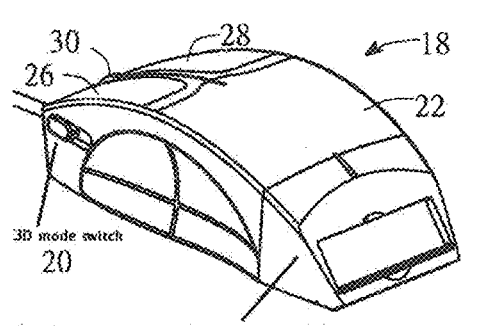
FIG. 6a          FIG. 6b
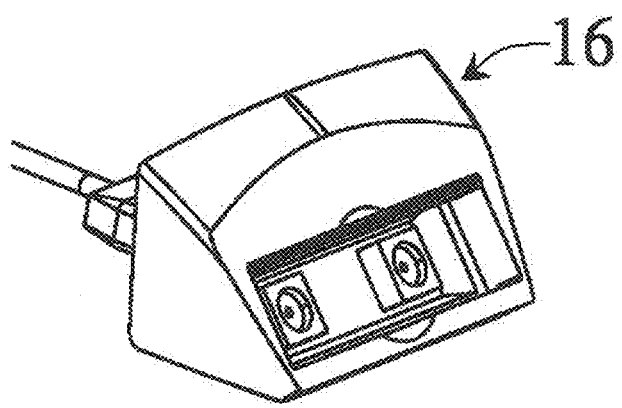
FIG. 7

THREE-DIMENSIONAL (3D) HUMAN-COMPUTER INTERACTION SYSTEM USING COMPUTER MOUSE AS A 3D POINTING DEVICE AND AN OPERATION METHOD THEREOF

This utility patent application claims the benefit of priority in U.S. Provisional Patent Application Ser. No. 61/830,168 filed on Jun. 3, 2013, the entirety of the disclosure of which is incorporated herein by reference.

TECHNICAL FIELD

The present disclosure relates to two-dimensional (2D) and three-dimensional (3D) computer user interface systems. More specifically, this disclosure pertains to 3D user interface systems allowing switching between 2D and 3D modes. A 2D/3D human-computer interaction system is provided using one or more pointing/input devices to support 2D and 3D pointing and input.

BACKGROUND OF THE INVENTION

The operation of a conventional mechanical or optical pointing or input device such as a mechanical or optical computer mouse is well known in the art. By use of these devices, the user can select files, programs, or actions from lists, groups of icons, etc., and can "gesturally" move files, programs, etc. issue commands or map to specific actions, for example in drawing programs.

As examples, a mechanical computer mouse relies on one or more wheels and/or balls to track movement or displacement information relative to forward-backward and left-to-right movement of the computer mouse, for example by interrupting infrared beams of light directed at light sensors to create pulses representative of wheel or ball movement. Simple logic circuits interpret the relative timing of the pulses to indicate which direction the wheel(s) or ball(s) is moving, which is then converted by driver software into motion of a visual indicator such as a pointer, cursor, or cross-hair along X and Y axes of a computing device display screen.

An optical computer mouse replaces the mechanical mouse wheels or balls with one or more light sources such as light-emitting diodes (LEDs) or laser diodes to detect movement of the mouse relative to an underlying surface such as a mouse pad. The inertial/gyroscopic computer mouse uses a tuning fork or other accelerometer to detect rotary movement for every axis supported, most commonly using 2 degrees of rotational freedom and being insensitive to spatial translation. The user need only perform small wrist rotations to move a pointer or cursor on a display screen.

Typically, the above conventional types of computer mice do not provide the option of three-dimensional (3D) pointing or input, but rather control the motion of a pointer or cursor in a 2D graphical user interface. However, three-dimensional pointing and input have long been wanted features in human-computer interactions. Such 3D pointing/input allows a user to accomplish tasks that are not possible with a two-dimensional (2D) pointing device such as the conventional computer mice discussed above. For example, a 3D pointing device allows the user to perform tasks such as 3D sculpturing or drawing, "flying" in multi-dimensional space (for example, three-dimensional space defined by X, Y, and Z axes) such as during gaming, etc.

In order to accomplish 2D or 3D pointing, it is a requirement to be able to identify the location of a pointing device with respect to a reference point in 2D or 3D space. In the case of 2D pointing, this is relatively simple. For instance, a conventional optical or mechanical computer mouse can easily measure a distance traveled with respect to a previous location in both X and Y directions in any moment and, consequently, can report its current location in real time and display a cursor or other visible marker on a display screen of a computing device accordingly.

Three-dimensional pointing/input is more complex. There are two conventional ways to accomplish 3D pointing depending on whether the pointing device has a distance measuring component or not. If the pointing device has a distance measuring component, an imager such as an IR camera may be integrated into the pointing device to detect lights from an IR emitter of a console such as the console of a gaming device, and calculate spatial coordinates for the pointing device accordingly. The Wii® Remote marketed by Nintendo® falls within that category. A problem with this approach is that the pointing device spatial coordinates can only be calculated when its imager has a direct line of sight to a sensor bar associated with the gaming device console.

If the pointing device does not include a distance measuring component, a separate component is required to measure the distance between the pointing device and, for example, a gaming device or base station, or to identify the location of the pointing device with respect to the gaming device or base station. All gesture-based pointing device approaches, such the Kinect® device marketed by Microsoft®, belong to this latter category. In this case, the fingers or the hands of a user play the role of a pointing device and a special imaging device is required to identify the locations of the fingers or hands of the user. Three-dimensional mice such as 3Dconnexion/Logitech's® SpaceMouse® in the early 1990s and Kantek's® 3D RingMouse® in the late 1990s, also known as bats, flying mice or wands, also fall in this category. As an example, the RingMouse® was tracked by a base station through ultrasound. This approach has been found to be unable to provide sufficient resolution.

There have been prior art attempts to combine a pointing component and an imaging component into a single device. For example, a prior art computer mouse included a digital camera mounted into a housing of the mouse (see FIG. 1). This device also included a mode selection system allowing the device to transition between a 2D mouse function and a digital camera function. However, the prior art device cannot function as a 3D pointer.

To the author's knowledge, no pointing devices exist wherein a pointing/input device such as computer mouse configured for conventional 2D pointing can also be configured as a 3D pointing device in a 3D human-computer interaction system.

SUMMARY OF THE INVENTION

To solve the foregoing problems and address the identified need in the art, the present disclosure provides an input or pointing device which can be transitioned between conventional 2D pointing and 3D pointing. The pointing device uses a multi-view imaging device to support 3D pointing on any type of graphical user interface such as a computing device 2D or 3D display screen. Systems and methods incorporating these devices are provided.

In one aspect, a three-dimensional user interface system is provided including at least one pointing/input device and an imaging device. The imaging device is configured for capturing one or more image frames each providing at least two different views of a scene including the at least one pointing/input device. The pointing/input device includes at least one visible indicia providing at least one reference point for the multi-view imaging device and the software. The imaging device is a multi-view imaging device which provides at least two different views of the scene per each of the one or more image frames captured, such as a dual lens video recording device or a single lens video recording device.

One or more software programs are provided including executable instructions for calculating from the one or more image frames at least a spatial and a velocity parameter of the at least one pointing/input device when moved through a three-dimensional space. The software likewise renders on a graphical user interface of a computing device a visual marker such as a pointer, cursor, icon, etc. corresponding to the spatial and velocity parameters of the at least one pointing/input device in three-dimensional space. The software derives this information from a number of attribute parameters of the pointing/input device, using the visible indicia as reference points.

In another aspect, a method for three-dimensional pointing and/or data input is provided. The method includes steps of moving the at least one pointing/input device in a three-dimensional space within a field of view of the imaging device. The imaging device is operably connected to a computing device having at least one processor, at least one memory, and at least one graphical user interface. At least one image frame providing at least two views of a scene including the at least one pointing/input device is captured using the imaging device, and used as described above to calculate at least a spatial and a velocity parameter of the at least one pointing/input device when moved through the three-dimensional space. Then a visual marker corresponding to the spatial and velocity parameters of the at least one pointing/input device in three-dimensional space is rendered on a graphical user interface.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims. Unless otherwise indicated, any patent and/or non-patent citations discussed herein are specifically incorporated by reference in their entirety into the present disclosure.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 6a and 6b show a multi-view imaging device incorporated into a housing of a pointing/input device according to the present disclosure, showing a cover lifted (FIG. 6a) or lowered (FIG. 6b) to respectively expose or protect the imaging device;

FIG. 7 shows the integrated multi-view imaging device of FIGS. 6a and 6b, separated from the pointing device;

DETAILED DESCRIPTION OF THE INVENTION

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention. Also, it is to be understood that other embodiments may be utilized and that process, reagent, materials, software, and/or other changes may be made without departing from the scope of the present invention.

Figure 1:
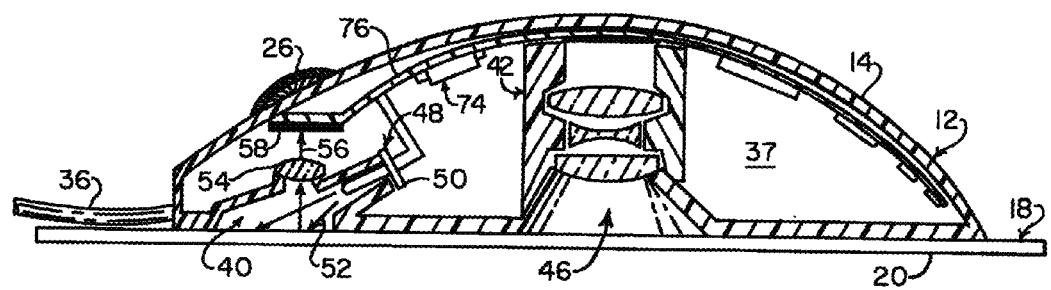
FIG. 1 shows a prior art computer mouse having an integrated digital camera.
Figure 2:
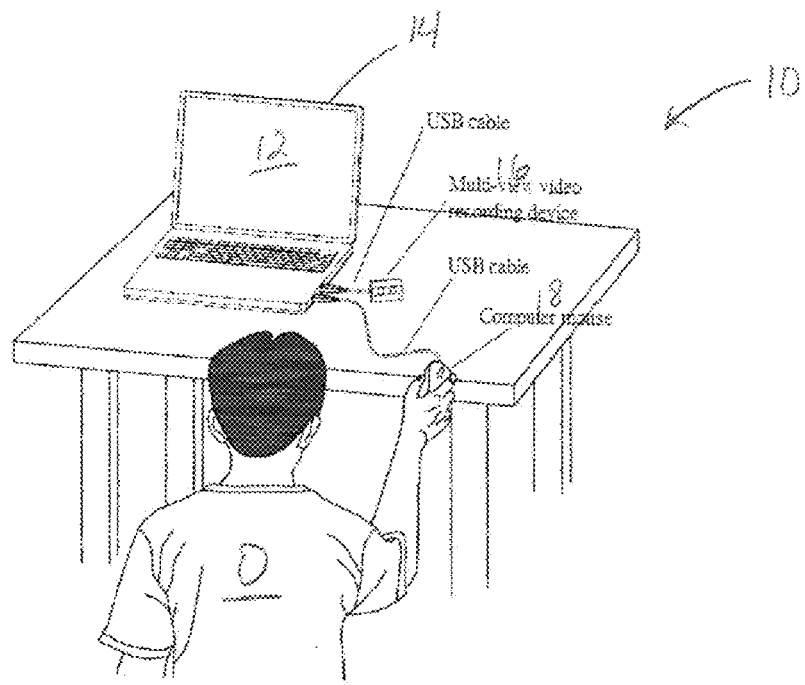
FIG. 2 shows an embodiment of a 3D human-computer interaction system using a computer mouse pointing/input device and a multi-view imaging device.

The present disclosure relates to a 3D human-computer interaction system 10 that supports 3D pointing and input in a graphical user interface 12 of a computing device 14. The system comprises a multi-view imaging device 16, at least one pointing/input device 18 such as a computer mouse, and one or more computer programs. The imaging device 16 and the at least one pointing/input device 18 are operably connected directly or indirectly to a computing device 14 by wired or wireless means, such as by universal serial bus (USB) cables or via wireless transmitters/receivers (see FIG. 2).

The pointing/input device 18 of the present disclosure is adapted for both 2D and 3D pointing. When used as a standard 2D pointing/input device, it is operated as a typical 2D optical or mechanical computer mouse and performs all the typical operations expected of such, such as moving a cursor around within a graphical user interface, making a single left click, single right click, double left click, "dragging and dropping" an item, or scrolling a page up or down. The configuration and operation of a 2D pointing/input device 18 to display movement information and as an input device is well known to the skilled artisan.

Figure 3:
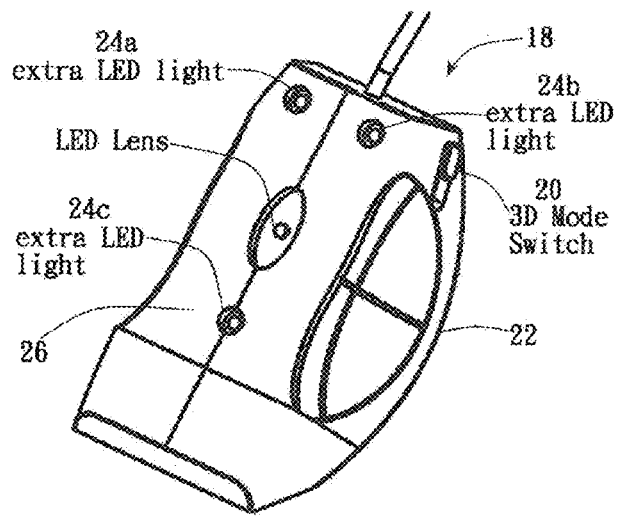
FIG. 3 shows a bottom view of the computer mouse of FIG. 2.
Figure 4:
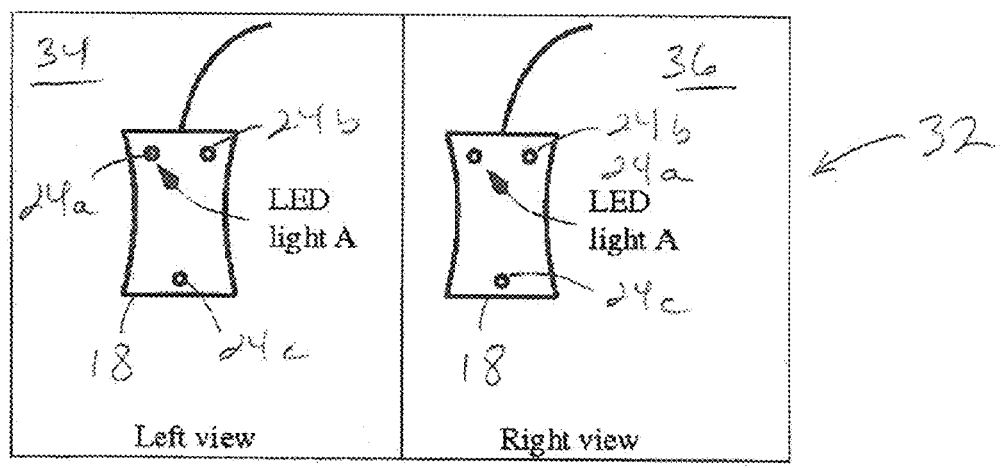
FIG. 4 depicts a representative frame captured by the imaging device of the present disclosure, showing two different views of the pointing device.

To use the computer mouse as a 3D pointing/input device, an operator O actuates a 3D mode switch 20, in an embodiment shown disposed on a side of a housing 22 of the pointing/input device 18 (see FIGS. 3 and 4). The function of this switch is to turn off the 2D scanning function of the pointing/input device 18 and configure the pointing/input device 18 for 3D scanning by the imaging device 16. Actuating the 3D mode switch 20 activates visible indicia 24, shown in the example embodiment of FIGS. 3 and 4 as light sources, specifically three LED lights 24a, 24b, 24c disposed on a bottom surface 26 of the pointing/input device 18 housing 22 (see FIG. 3). It will be appreciated that LED lights are only one non-limiting example of potential structures serving as visible indicia 24, and that other suitable indicia are contemplated for use. The purpose of the visible indicia 24 will be further described below. Of course, it will be appreciated that a switch 20 is only one embodiment of an actuator for activating visible indicia 24. For example, it is contemplated to provide a pointing/input device 18 which automatically disables the 2D scanning function of the pointing/input device 18 and activates visible indicia 24 when the pointing/input device 18 is lifted and/or tilted by the operator O to position the visible indicia 24 within a field of view of the imaging device 16.

The operator O then holds the pointing/input device 18 in his/her hand, with the visible indicia 24 positioned within a field of view of the imaging device 16 (see FIG. 2), to perform 3D pointing/input in a 3D space. The operator O can move the pointing/input device 18 in any desired direction (with the caveat that the visible indicia 24 must remain within the horizontal and vertical fields of view of the imaging device 16), click the left or the right buttons 26, 28 (see FIG. 6) at any time, or scroll the middle button or wheel 30 (see FIG. 6) at any time.

All the pointing/input operations expected of a pointing/input device 18 in 2D mode (pointing, clicking, scrolling, "drag and drop," etc.) are still supported, but with room for many more possible 3D operations since the system 10 provides spatial and velocity attribute parameters to the computing device 14 and software for each image frame captured by the imaging device 16. Eighteen parameters are computed by the computing device 14 and grouped into six geometric/motion attributes (a current 3D location or position of the pointing/input device 18 in a captured image frame, a normal vector, a tangent vector, a bi-normal vector, a motion velocity, and a motion acceleration of the pointing/input device 18) each having three coordinate components (x-, y-, and z-coordinates).

The operator O may be undertaking operations with the pointing/input device 18 that do not require 3D applications, such as 3D rotation, flip, etc., but may still prefer to use the present system. For example, the user may not have a suitable surface available for conventional optical mouse pointing/input, such as when seated in a crowded vehicle. In this situation, the skilled artisan will appreciate that the visible indicia 24 may be provided by fewer than three LED lights as described above, and that 2D pointing/input are possible without requiring a flat surface over which to translate the pointing/input device 18.

The operator O can also use multiple pointing/input devices 18 in the 3D mode, for example holding a pointing/input device 18 in each hand. In this case, information on current location, normal vector, tangent vector, motion velocity and motion acceleration of both pointing/input devices 18 will be provided by the system 10, but typically a location of a visible marker such as a cursor or pointer icon (not shown) displayed on a graphical user interface 12 such as a display screen of a computing device 14 can be controlled by only one pointing/input device 18 at any time and only one pointing/input device 18 can be clicked or scrolled at any time.

The imaging device 16 is typically a multi-view imaging device, such as a dual-lens imager or a single-lens multi-view digital video recorder operatively coupled to an image sensor which encodes images for later decoding by the computing device 14. Any suitable video recorders which are or can be adapted for use with computing devices are contemplated, such as web cams. A number of suitable image sensors are known in the art, including without limitation conventional charge-coupled device (CCD) or complementary metal oxide semiconductor (CMOS) technology. The requirement is that at least two different views of a scene including the pointing/input device 18 are rendered for each frame captured by the imaging device 16. In an embodiment, the imaging device captures at least three such frames per second. In another embodiment, the imaging device captures fifteen frames per second.

FIG. 4 illustrates a captured image frame 32 providing two views, a left view 34 and a right view 36 of the pointing/input device 18. When the pointing/input device 18 is not placed in 3D mode, the imaging device 16 can be used as a 2D or 3D webcam for the computing device 14, depending on the display screen type of the computing device 14. If the display screen 12 allows only 2D displays, the imaging device 16 functions as a 2D webcam by rendering only the left view 34 of each frame 32. If the display screen 12 allows 3D displays, the imaging device 16 functions as a 3D webcam, allowing rendering an interlaced image of at least portions of the left view 34 and the right view 36 of each frame 32. However, it will be appreciated that the 3D pointing/input mode of the present system 10 functions in both display screen types.

A variety of multi-view imaging systems are known in the art and contemplated for use herein, such as the devices and systems disclosed in U.S. Published Patent Appl. No. 2010/0289874, U.S. Published Patent Appl. No. 2011/0310230, and U.S. patent application Ser. No. 13/921,739, the disclosures of each of which are incorporated in their entirety herein by reference, which provide multi-view images to a single-lens recording device for further processing. Likewise, a number of methods for rendering three-dimensional images by interlacing information from multiple two-dimensional views of a same scene are known, such as the methods disclosed in the above references.

Figure 5:
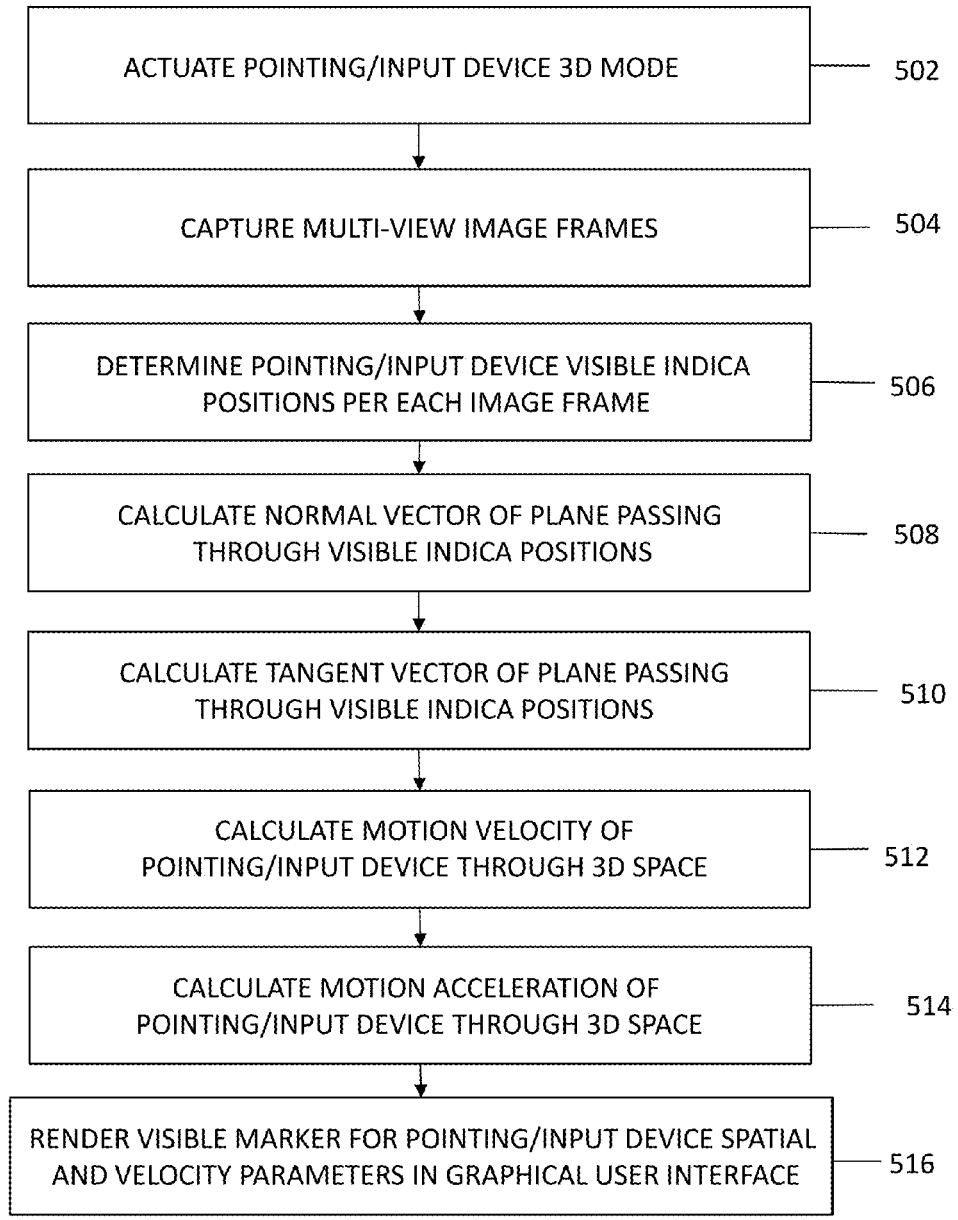
FIG. 5 depicts a method for providing spatial and velocity parameters of a pointing/input device from the frame of FIG. 4.

FIG. 5 depicts a high level flow chart of a process for 3D pointing or input. When the 3D mode switch 20 of the pointing/input device 18 is actuated (step 502) to allow pointing and information input in 3D mode, the system 10 software stops rendering the frames 32 captured by the imaging device 16, and starts computing attribute parameters of the pointing/input 18 now being moved by the operator O in 3D parameters. With two different views of the pointing/input device 18 provided in each captured frame 32 (step 504), the system 10 software can compute 3D locations (step 506) of the visible indicia 24 (in the depicted embodiments, the three extra LED lights 24a, 24b, 24c at the bottom surface 26 of the pointing/input device 18 housing 22) as they move through three-dimensional space, and also a normal vector (step 508) and a tangent vector (step 510) of a plane that passes through the visible indicia 24 as they move through three-dimensional space.

A motion velocity of the pointing/input device 18 can likewise be calculated (step 512) using a position of the visible indicia 24 from a first frame 32 and one or more subsequent frames 32b, 32c, ..., 32x captured by the imaging device 16, and in turn a motion acceleration of the pointing/input device 18 can be calculated (step 514) using a current calculated motion velocity and a previous calculated motion velocity. This type of calculation is known to the skilled artisan in this field, such as those disclosed in U.S. Published Patent Appl. No. 2010/0289874, U.S. Published Patent Appl. No. 2011/0310230, and U.S. patent application Ser. No. 13/921,739. A specific, non-limiting example of a typical calculation of these parameters is provided below. This information can then be used to render (step 516; see also the example calculations set forth below) a position and movement in a three-dimensional display of a marker corresponding precisely to the movements of the pointing/input device 18 in three-dimensional space. As is known, representative visible markers can be cursors, pointers, cross-hairs, icons, etc.

In more detail, in an embodiment, by identifying locations of LED light 24a in the left view 34 and the right view 36 of a captured image frame 32 (see FIG. 4), the system 10 can use a standard triangulation method to find a 3D location of the LED light 24a with respect to the imaging device 16. The location of the visible marker (not shown) on the graphical user interface 12 is then determined by the 3D location of the extra LED light 24a. This process is repeated in sequential captured frames 32b, 32c, etc. to render a visible marker corresponding precisely to the positions of the pointing/input device 18 as the operator O moves the device through along X, Y, and Z axes of three-dimensional space.

In the following we show the calculation process of the eighteen attribute parameters referenced above. Let the world coordinates of the LED lights A, B, and C (see FIG. 3) be $(A_x, A_y, A_z)$, $(B_x, B_y, B_z)$, and $(C_x, C_y, C_z)$, respectively. Once the world coordinates of these points are available or computed using a standard triangulation method as is disclosed in U.S. Published Patent Appl. No. 2010/0289874, U.S. Published Patent Appl. No. 2011/0310230, or U.S. patent application Ser. No. 13/921,739, eighteen attribute parameters can be computed and grouped into six attributes (so that each attribute contains three parameters) as follows. These attributes include current location (D), tangent vector ($\vec{t}$), normal vector ($\vec{n}$), bi-normal vector ($\vec{b}$), velocity vector ($\vec{v}$), and acceleration vector ($\vec{a}$).

First, choose an arbitrary LED light among the above three, for example LED light A (see FIG. 4), as a reference point. Then the attribute "current location" is defined as the location of A, $(A_x, A_y, A_z)$. The other attributes are defined as follows.

$$\vec{t} = \langle B_x - A_x, B_y - A_y, B_z - A_z \rangle;$$

$$\vec{n} = \vec{AB} \times \vec{AC} = \begin{vmatrix} \vec{i} & \vec{j} & \vec{k} \\ B_x - A_x & B_y - A_y & B_z - A_z \\ C_x - A_x & C_y - A_y & C_z - A_z \end{vmatrix};$$

$$\vec{b} = \vec{n} \times \vec{t} = \begin{vmatrix} \vec{i} & \vec{j} & \vec{k} \\ n_x & n_y & n_z \\ t_x & t_y & t_z \end{vmatrix},$$

where $m_x$, $m_y$, and $m_z$ represent the x-, y- and z-component of the vector $\vec{m}$, respectively;

$\vec{v} = D - D^{pre}$, where $D^{pre}$ is the location of A in the previous frame;

$\vec{a} = \vec{v} - \vec{v}^{pre}$, where $\vec{v}^{pre}$ is the representation of the vector $\vec{v}$ in the previous frame.

In the above formula, the symbol "×" is the cross product operator, and "|M|" is the determinant of the 3×3 matrix M whose value is computed as follows:

$$\begin{vmatrix} \vec{i} & \vec{j} & \vec{k} \\ u & v & w \\ p & q & r \end{vmatrix} = \langle vr - wq, wp - ur, uq - vp \rangle$$

The imaging device 16 typically must be calibrated and rectified to ensure sufficient precision of the above calculations. The calibration/rectification process for a single-lens multi-view video recording device is different from the calibration/rectification process for a dual-lens video recording device. Exemplary calibration and rectification procedures and calculations are known to the skilled artisan, for example as set forth in U.S. Published Patent Appl. No. 2010/0289874.

In one exemplary embodiment, the imaging device 16 is installed as an attachment to the pointing/input device 18 to improve mobility, portability, and convenience of the system 10 (see FIG. 6). Detaching the imaging device 16 from the pointing/input device 18 (see FIG. 7) and connecting the imaging device 16 directly or indirectly to a computing device 14 provides a multi-view video recording device for the system 10 (see FIG. 2).

Figure 8:
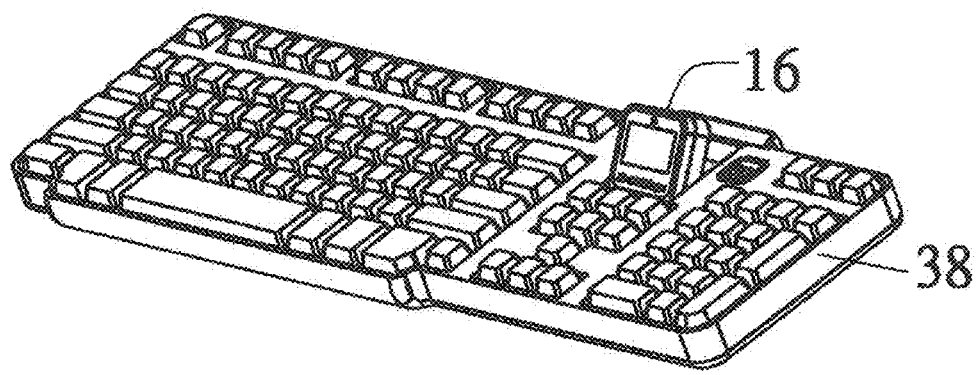
FIG. 8 shows a multi-view imaging device of the present disclosure, integrated into a user interface such as a keyboard of a desktop computer.
Figure 9:
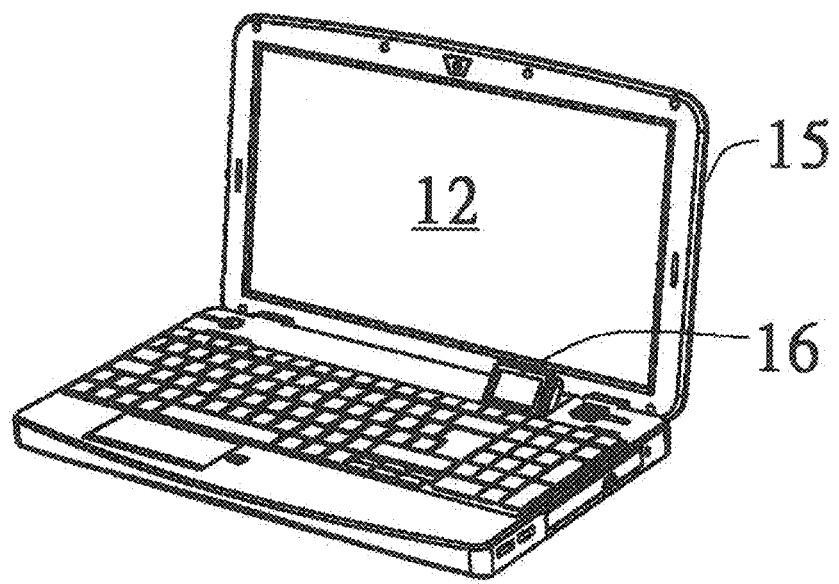
FIG. 9 shows a multi-view imaging device of the present disclosure, integrated into a user interface such as a keyboard of a laptop or notebook computer.

In another embodiment, the imaging device 16 is installed as a component of or a peripheral to a keyboard 38 of a computing device such as a desktop computer (see FIG. 8). In yet another embodiment, the imaging device 16 is installed as a component of or a peripheral to a laptop or a notebook computer 15 (see FIG. 9). Of course, the skilled artisan will appreciate that the system 10 can be integrated into or provided as a peripheral for any computing device 14, including without limitation desktop or portable computers, tablet computers, smartphones, personal digital assistants (PDAs), Web-enabled or so-called "smart" televisions, etc.

Summarizing, the present disclosure provides a 3D pointing/input system including an input or pointing device which can conveniently be transitioned between use in conventional 2D pointing/input and 3D pointing/input, i.e. between 2D and 3D mode. The system uses a multi-view imaging device which renders 3D images of the pointing/input device spatial and velocity parameters from multi-view 2D images. Thus, the system of the present disclosure supports 3D pointing/input on any type of graphical user interface, without requiring a specialized 3D user interface. However, the system can be used with any suitable graphical user interface such as a computing device 2D or 3D display screen.

One of ordinary skill in the art will recognize that additional embodiments of the invention are also possible without departing from the teachings herein. Thus, the foregoing description is presented for purposes of illustration and description of the various aspects of the invention, and one of ordinary skill in the art will recognize that additional embodiments of the invention are possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures. All such modifications and variations are within the scope of the invention as determined by the appended claims when interpreted in accordance with the breadth to which they are fairly, legally and equitably entitled.

What is claimed is:

1. A three-dimensional user interface system, comprising:
   at least one pointing/input device including a plurality of visible indicia on a surface thereof;
   a multi-view imaging device configured for capturing a plurality of sequential image frames, each of the captured image frames providing at least two different views of a scene comprising the at least one pointing/input device; and
   at least one computer program product operable on a computing device having at least one processor, at least one memory, and at least one graphical user interface;
   wherein the at least one computer program product includes executable instructions for calculating from the plurality of sequential image frames at least a spatial and a velocity parameter of the at least one pointing/input device when moved through a three-dimensional space, and for rendering, on the graphical user interface, a visual marker corresponding to the spatial and velocity parameters of the at least one pointing/input device in three-dimensional space.

2. The system of claim 1, wherein the plurality of visible indicia provide at least one reference point for the multi-view imaging device.

3. The system of claim 1, wherein the plurality of visible indicia are actuable.

4. The system of claim 3, wherein the plurality of visible indicia comprises at least three separate light sources.

5. The system of claim 1, wherein the multi-view imaging device provides at least two different views of the scene per each of the image frames captured.

6. The system of claim 3, wherein the plurality of visible indicia comprises at least three separate light sources.

7. The system of claim 1, wherein the multi-view imaging device provides at least two different views of the scene per each of the image frames captured.

8. The system of claim 7, wherein the multi-view imaging device is configured to capture at least three image frames per second.

9. The system of claim 7, wherein the multi-view imaging device is a dual lens video recording device operably linked to an image sensor for converting the captured image frames into digital data.

10. The system of claim 7, wherein the multi-view imaging device is a single lens video recording device operably linked to a reflector for providing the at least two different views of the scene per each of the image frames captured and an image sensor for converting the captured image frames into digital data.

11. The system of claim 7, wherein the computer program product calculates at least a position and a velocity in three-dimensional space of the at least one pointing/input device from the image frames captured by the multi-view imaging device.

12. The system of claim 11, wherein the computer program product includes executable instructions to provide a spatial and velocity parameter of the at least one pointing/input device from the plurality of sequential image frames captured by the multi-view imaging device by at least:
   determining a position in the plurality of sequential image frames of the at least one visible indicia when moved through the three-dimensional space;
   calculating a normal vector, a bi-normal vector, and a tangent vector of a plane passing through the at least one visible indicia when moved through the three-dimensional space; and
   calculating a motion velocity and an acceleration velocity of the at least one visible indicia when moved through the three-dimensional space.

13. In a computing system environment, a method for three-dimensional pointing and/or data input, comprising:
   moving at least one pointing/input device in a three-dimensional space within a field of view of a multi-view imaging device operably connected to a computing device having at least one processor, at least one memory, and at least one graphical user interface;
   by the multi-view imaging device, capturing a plurality of sequential image frames with each image frame providing at least two views of a scene including the at least one pointing/input device;
   from the captured image frames, calculating at least a spatial and a velocity parameter of the at least one pointing/input device when moved through the three-dimensional space; and
   rendering, on the graphical user interface, a visual marker corresponding to the spatial and velocity parameters of the at least one pointing/input device in three-dimensional space;
   wherein the at least one pointing device includes a plurality of visible indicia on a surface thereof.

14. The method of claim 13, including providing at least one computer program product comprising executable instructions operable on at least one computing device having at least one processor and at least one memory, for calculating from the captured image frames at least the spatial and the velocity parameters of the at least one pointing/input device when moved through a three-dimensional space.

15. The method of claim 13, including providing a plurality of actuable visible indicia on the surface of the at least one pointing/input device.

16. The method of claim 15, wherein the at least one computer program product determines a position in the at least one captured image frame of the plurality of visible indicia when moved through the three-dimensional space, calculates a normal vector, a bi-normal vector, and a tangent vector of a plane passing through the plurality of visible indicia when moved through the three-dimensional space, and calculates a motion velocity and an acceleration velocity of the plurality of visible indicia when moved through the three-dimensional space.

17. The method of claim 13, including providing a multi-view imaging device configured to capture at least three image frames per second.

18. The method of claim 16, further including steps of rectifying and calibrating the multi-view imaging device.

19. The method of claim 13, including providing a multi-view imaging device configured to capture at least fifteen image frames per second.

20. The method of claim 13, including providing a multi-view imaging device comprising a dual lens video recording device operably linked to an image sensor for converting the captured image frames into digital data.

21. The method of claim 13, including providing a multi-view imaging device comprising a single lens video recording device operably linked to a reflector for providing the at least two different views of the scene per each of the image frames captured and an image sensor for converting the captured image frames into digital data.

22. A three-dimensional user interface system, comprising:
   at least one pointing/input device including a plurality of actuable visible indicia on a surface thereof;
   a multi-view imaging device configured for capturing a plurality of sequential image frames, the multi-view imaging device comprising a single lens video recording device operably linked to a reflector for providing at least two different views of a scene comprising the at least one pointing/input device per each image frame captured and an image sensor for converting the captured image frames into digital data; and
   at least one computer program product operable on a computing device having at least one processor, at least one memory, and at least one graphical user interface;
   wherein the at least one computer program product includes executable instructions for calculating from the plurality of captured sequential image frames at least a spatial and a velocity parameter of the at least one pointing/input device when moved through a three-dimensional space, and for rendering, on the graphical user interface, a visual marker corresponding to the spatial and velocity parameters of the at least one pointing/input device in three-dimensional space;

further wherein the plurality of visible indicia provide a reference point for the multi-view imaging device.

* * * * *